Oct. 31, 1933.　　　A. URFER　　　1,933,195
SENSITIVE ALTIMETER
Filed April 6, 1932　　　3 Sheets-Sheet 1
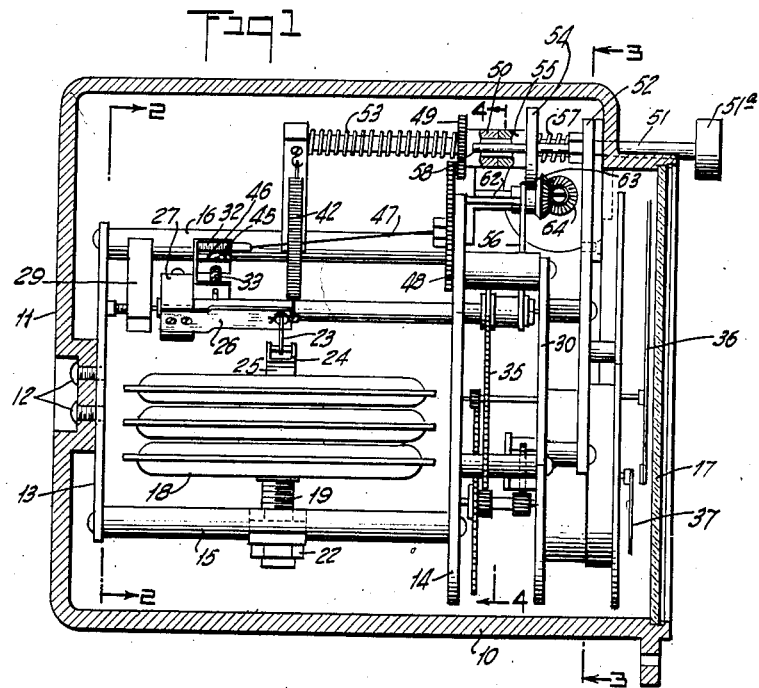
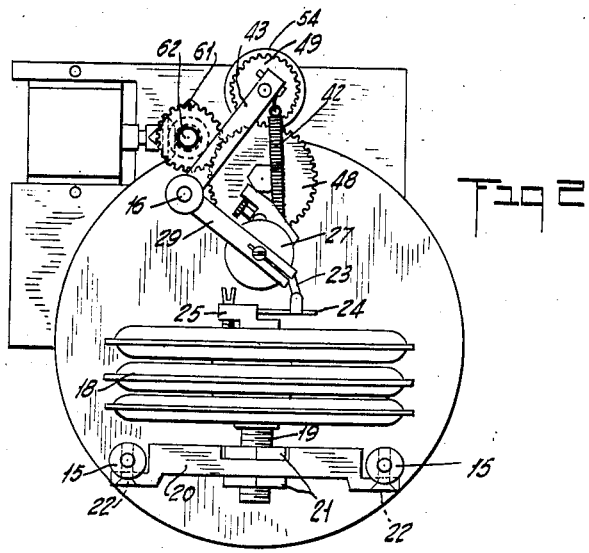
INVENTOR.
ADOLF URFER,
BY Stephen Cerstvik
ATTORNEY Oct. 31, 1933.     A. URFER     1,933,195
SENSITIVE ALTIMETER
Filed April 6, 1932     3 Sheets-Sheet 2
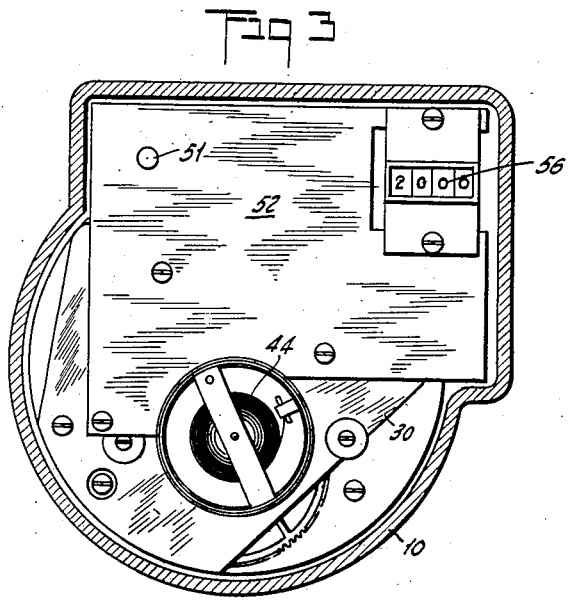
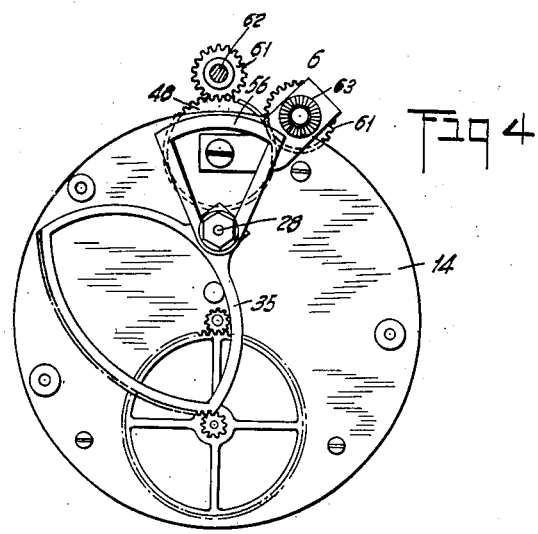
INVENTOR.
ADOLF URFER.
BY Stephen Cerstvik
ATTORNEY Oct. 31, 1933.　　　　A. URFER　　　　1,933,195
SENSITIVE ALTIMETER
Filed April 6, 1932　　　3 Sheets-Sheet 3
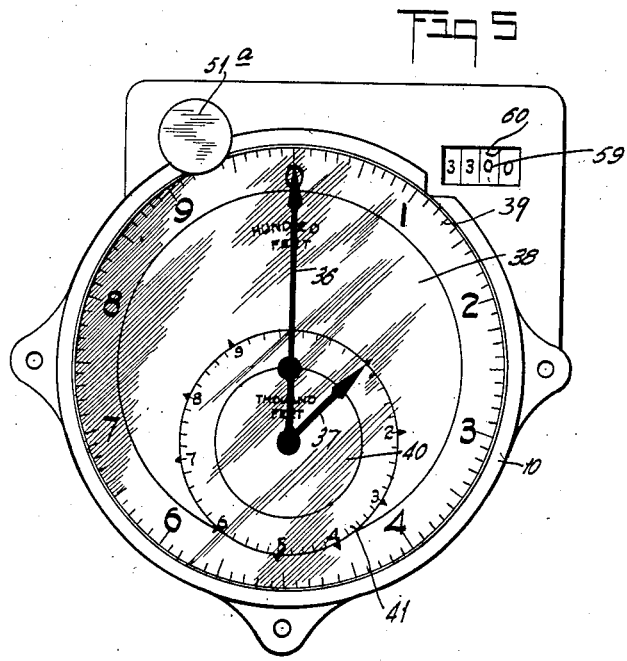
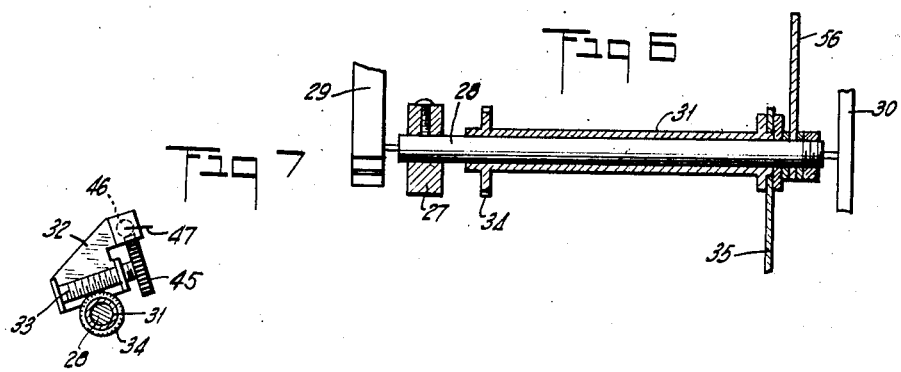
INVENTOR.
ADOLF URFER.
BY Stephen Gerstvik
ATTORNEY Patented Oct. 31, 1933

1,933,195

UNITED STATES PATENT OFFICE 1,933,195

SENSITIVE ALTIMETER

Adolf Urfer, Richmond Hill, N. Y., assignor to Bendix Aviation Corporation, South Bend, Ind., a corporation of Delaware Application April 6, 1932. Serial No. 603,648

26 Claims. (Cl. 73—4)

This invention relates to instruments for indicating altitude, and more particularly to a sensitive altimeter of the type adapted to be used on aircraft.

One of the objects of the present invention is to provide a novel altimeter which is so constructed as to enable the user to preset the instrument for a predetermined altitude in order to enable the user to reach a selected objective, the instrument being also adapted to indicate the various altitudes through which the user moves in reaching his objective.

Another object of the invention is to provide a novel altimeter which is so constructed as to enable the user to preset the instrument for a particular altitude without rendering the instrument ineffective thereafter to clearly indicate altitudes other than the preset altitude.

Another object is to produce a novel altimeter of the type embodying a pressure sensitive member, the instrument being so constructed that the sensitive member is rendered ineffective during the setting of the altimeter for a predetermined altitude.

A further object is to provide a novel altimeter which is so constructed that the operative connections between the pressure sensitive means and the indicating means are not broken during setting of the instrument for a predetermined altitude, but the sensitive means are rendered ineffective to actuate the indicating elements during the setting operation.

The above and other objects will appear more fully hereinafter in the detail description of the mechanism illustrated in the accompanying drawings. It is to be expressly understood, however, that the drawings are for purposes of illustration only and are not designed as a definition of the limits of the invention, primary reference being had, for this purpose, to the appended claims.

In the drawings, wherein like reference characters refer to like parts throughout the several views:

Fig. 1 is a sectional side elevation of one form of instrument embodying the present invention;

Figs. 2, 3 and 4 are sectional views taken on the lines 2—2, 3—3 and 4—4, respectively, of Fig. 1;

Fig. 5 is a front end elevation of the mechanism shown in Fig. 1;

Fig. 6 is an enlarged detail view, partly in section, illustrating a portion of one form of motion-amplifying means which may be employed in carrying out the present invention; and Fig. 7 is an enlarged detail view, partly in section, illustrating another portion of the mechanism for setting the instrument for a predetermined altitude.

In the form shown, the altimeter, comprising the subject matter of the present invention, includes a casing or housing 10 which is preferably formed of a light substance such as aluminum and which, in general outline, is cup-shaped, having a closed end 11 to the inner surface of which is attached, as by means of screws 12, a frame for supporting certain elements of the instrument and maintaining the same in spaced operative relation. Preferably, the frame includes a disc 13 and a plate 14 which are fixedly held in spaced relation by means of rods 15 and 16, the plate 13 being held in engagement with the closed end of the housing by means of screws 12. The front end of the housing is closed by a transparent member 17 removably secured in position in any suitable manner well known in the art. Housing 10 is not sealed but is open to atmospheric pressure in any suitable way. If the instrument is used on aircraft, the housing preferably has one end of a tube (not shown) leading to the atmospheric opening in the housing, the opposite end of the tube being led to a point of static pressure so that the pressure inside said housing will be unaffected by motion of the instrument and will vary solely in accordance with pressure changes due to changes in altitude.

The instrument includes a pressure sensitive member adapted to expand and contract under variations of pressure resulting from changes in altitude. In the form shown, the pressure sensitive element comprises an evacuated expansible and collapsible diaphragm or capsule 18, it being understood that the element may be formed from one or more aneroid capsules if desired. The lower surface of the evacuated member 18 is secured, as by means of brazing, to a threaded rod 19 adjustably secured to a transversely extending bar 20 as by means of locking nuts 21. The outer ends of bar 20 are attached in any suitable manner as by means of screws 22 to the lower surface of rods 15.

Means are provided for employing and amplifying the movements of the walls of the capsules 18 due to changes in pressure to produce indications in terms of barometric pressure or of altitude in feet or meters. As illustrated, said means include a link 23 pivotally connected at its lower end to a temperature compensating bar 24 that is attached to a suitable bracket 25 rigidly secured in any suitable manner to the upper movable wall of the expansible and collapsible vessel 18. The upper end of link 23 is pivotally connected to a bar 26 that is rigidly secured to a cylindrical collar 27 that is rigidly attached to a rotatably mounted shaft 28 journaled at the inner end thereof in an arm 29 that is secured in any suitable manner to rod 16. The opposite or front end of shaft 28 is journaled in a plate 30 constituting a portion of the frame and secured in spaced relation to plate 14 in any suitable manner.

Pivotal movement of shaft 28, resulting from an expansion or contraction of the collapsible member and the linkage above-described, is transmitted to a sleeve 31 surrounding the major portion of shaft 28 and rotatably mounted thereon. For this purpose, collar 27 has secured thereto an E-shaped bracket 32 (Figs. 1 and 7), in which is journaled a worm shaft 33 which meshes with a worm gear 34 rigidly attached to, or formed integrally with, sleeve 31. Fixedly secured to the opposite end of sleeve 31, and preferably at a point intermediate plates 14 and 30, is a gear sector 35 which constitutes the primary element of a double gear train for actuating a high speed pointer 36 and a low speed pointer 37, whereby the movements of the aneroid capsule are amplified and full scale indications are obtained. Details of the gear trains per se constitute no part of the present invention, it being only necessary to point out to those skilled in the art that the gear train is preferably so constructed that pointer 36 makes ten revolutions over a suitable dial 38 carrying a scale 39 graduated in hundreds of feet for each revolution of the pointer 37. The latter is operatively associated with a dial 40 provided with a scale 41 graduated in thousands of feet.

Bracket 32, worm 33 and worm wheel 34 normally constitute a rigid connection between shaft 28 and sleeve 31, whereby movement of the expansible and collapsible member, which has been converted by the linkage described into angular movement of the shaft 28 and sleeve 31, is effective to rotate said shaft and sleeve in unison and, through the gear trains, to angularly displace the pointers in accordance with changes in pressure resulting from changes in altitude. In order to prevent forces, such as those resulting from vibrations, acceleration, etc., from unbalancing the mechanism and from disturbing the functioning of capsule 18, there is preferably provided a coil spring 42 suitably attached at one end to an arm 43 secured to rod 16 (Figs. 1 and 2), the opposite end of said spring being attached in any suitable manner to the bar 26 closely adjacent the pivotal connection for link 23.

A suitable hair spring 44 (Fig. 3) is operatively connected in any suitable manner with the low speed pointer 37. Spring 44 coacts with the collapsible and expansible vessel 18, during the collapsing movement of said vessel, to move the low speed pointer and, through the gear train, to move the high speed pointer to the proper indicating positions.

The instrument embodying the present invention includes means whereby the pointers may be preliminarily adjusted by the user so that said pointers will give a desired reading, such as a zero reading, when the instrument is moved to a pre-selected altitude, as for example, when the aircraft on which the instrument is mounted reaches a pre-selected altitude. It is also desirable that the operative connections between the pointers and the expansible and collapsible bellows should not be broken during the setting of the instrument for the pre-selected altitude in order that said instrument may immediately and automatically indicate the true altitude upon completion of the setting operation. For this purpose, the worm 33 (Figs. 1 and 7) has secured thereto a worm wheel 45 which meshes with a worm 46 that is journaled in the bracket 32. Fixedly attached to the front end of worm 46 is a flexible shaft 47 that may be formed of heavy piano wire, for example. The opposite end of flexible shaft 47 is fixedly secured to a gear wheel 48 adapted to be engaged by manually operated gear 49, the latter being provided with a hub portion 50 and being slidably mounted on a shaft 51 that is journaled at its front end in a plate 52, constituting a part of the instrument frame, and at its rear end in the arm 43, the opening in said arm being sufficiently large to permit sliding movement of said shaft 51 through the arm. A coil spring 53 normally maintains gear 49 out of mesh with gear 48, and said spring is also effective, through gear 49, 50 to maintain a friction disc 54, having a hub portion 55 slidably mounted on shaft 51, out of frictional engagement with a sector arm 56 fixedly attached to shaft 28 (Figs. 1 and 6). A coil spring 57 may be interposed between disc 54 and plate 52 to coact with the spring 53 in holding gear 49 and friction disc 54 in normal inoperative position. Preferably, plate 52 carries a small rod 58 which extends through, and has a loose fit in, an opening provided in disc 54, said rod being effective to prevent angular deflection of the disc on shaft or rod 51.

When it is desired to set the pointers for a pre-selected altitude, the operator moves rod 51 to the left, by manipulating button 51a, against the tension of springs 53, 57, whereupon disc 54 engages sector arm 56, thereby frictionally holding shaft 28 and the elements associated therewith against rotation. Simultaneously, gear 49 is moved into mesh with gear 48 and, when button 51a is rotated, gears 49 and 48 transmit motion to flexible shaft 47, worm 46, worm wheel 45, worm 33 and worm wheel 34, to rotate sleeve 31 and gear sector 35, whereby the pointers may be set as desired.

The brake constituted by disc 54 and sector 56, which latter may be slightly flexible if desired, is effective to hold shaft 28 against movement, whereby a portion of the motion amplifying means and the capsule 18 are rendered inoperative, and this without any breakage in the operative connections between the pointers and the capsule, there being sufficient flexibility in shaft 47 to permit of the required relative movement between the parts. As soon as button 51a is released, gear 49 and friction disc 54 are automatically returned to normal position so that the capsule is immediately rendered effective to actuate the pointers, whereupon the instrument will indicate the true altitude.

When the instrument has been set to give a predetermined reading for a pre-selected altitude, it is desirable that means be provided for indicating said selected altitude and that this indication be undisturbed during normal functioning of the instrument and while the same is being moved to the pre-selected altitude. To this end, the instrument includes a counter 59 suitably mounted on plate 52 and so arranged that the number-carrying dials of said counter are visible through an opening 60 (Fig. 5) in the housing. The number-carrying dials of the counter which, in the present instance are marked in feet, are actuated simultaneously with the setting of pointers 36, 37 by means of knob or button 51a, gear 49, gear 48, a gear 61 (Fig. 2) mounted on a shaft 62, a bevel gear 63 mounted on said shaft, and a cooperating bevel gear 64 secured to the operating shaft for the dials of the counter.

When knob 51a is actuated to adjust the pointers for a pre-selected altitude, the counter is simultaneously adjusted to indicate said pre-selected altitude and this indication is available at all times independently of the operation of the pointers 36 and 37 during normal functioning of the altimeter.

There is thus provided a novel altimeter adapted for ready installation and inexpensive manufacture. The instrument will indicate at all times the true altitude and the same may be set, in advance, to indicate the pre-selected altitude, whereby the user is assisted in reaching a selected objective. The pre-selected altitude indication is maintained without interfering with the normal operation of the instrument, and the latter may be adjusted without disrupting or breaking operative connections between the capsule and the pointers. Various changes may be made in the details of construction and arrangement of the parts without departing from the scope of the invention. As will be understood by those skilled in the art, the invention is not limited to an altimeter since certain features thereof are applicable to a plurality of indicating instruments, and reference will, therefore, be had primarily to the appended claims for a definition of the limits of said invention.

What is claimed is:

1. In an altimeter, a housing, a pressure sensitive capsule having one wall thereof rigidly secured to said housing, motion transmitting and amplifying means secured to another wall of said capsule, pointers operatively secured to said means, dials associated with said pointers, a counter secured to said housing adjacent said dials, and mechanism for adjusting said pointers and counter, said mechanism including means for holding a portion of said motion transmitting and amplifying means stationary during adjustment of the pointers.

2. In an altimeter, a housing, pressure sensitive means including an expansible and collapsible diaphragm having one wall thereof rigidly secured to said housing, pointers operatively and adjustably connected to said capsule, dials for the pointers carried by the housing, a counter secured to the housing, and common manually operable means for setting said counter and pointers, and for holding said capsule against movement during the setting operation.

3. In an altimeter, a pressure sensitive capsule, motion amplifying means operatively connected to said capsule, a plurality of pointers operatively and adjustably connected to said means, dials for each of the pointers, adjusting means for setting said pointers relative to said dials, and means actuated by the adjusting means to prevent transmission of motion from the capsule to the pointers during setting of the pointers.

4. In an altimeter, an expansible and collapsible diaphragm member, motion amplifying means adapted to be actuated by said diaphragm member, means including a pointer operatively connected to said amplifying means, a dial for the pointer, a counter mounted adjacent said dial, adjusting means for setting said pointer and counter, and means for preventing transmission of motion from said diaphragm member to said pointer during setting of the pointer and counter.

5. An altimeter comprising a housing, a pressure sensitive capsule mounted therein, motion amplifying means operatively connected to said capsule, a plurality of pointers operatively connected to said amplifying means, dials for said pointers, reference means for indicating a pre-set condition of the altimeter positioned adjacent said dials, means for adjusting the pointers relative to said dials and for setting said reference means, and means for rendering said capsule ineffective to actuate said amplifying means during adjustment of said pointers.

6. In an altimeter, a pressure sensitive capsule, means including a plurality of pointers operatively and adjustably connected to said capsule, indicating dials for the pointers, means for setting the pointers relative to said dials, and means for preventing transmission of motion from the capsule to the pointers during setting of the pointers.

7. In an altimeter, an expansible and collapsible capsule, motion amplifying means operatively connected to said capsule, a plurality of pointers operatively connected to said amplifying means, a dial for each of the pointers, means for setting the pointers relative to the dials, and a friction means for holding a portion of the amplifying means stationary during setting of the pointers.

8. In an altimeter, an expansible and collapsible member, motion amplifying means operatively connected to said member, pointers adapted to be actuated by said amplifying means, dials for the pointers, and mechanism for setting the pointers relative to the dials, said mechanism including friction means for preventing transmission of motion from said collapsible member to the pointers during setting of the pointers.

9. In an altimeter, a housing, a capsule mounted in said housing and secured thereto, motion amplifying means, a friction arm operatively connected to said capsule, pointers adapted to be actuated by said amplifying means, dials for the pointers, and means for setting the pointers relative to the dial including a manually operative member adapted to engage said arm whereby transmission of motion from the capsule to the pointers is prevented during setting of the pointers.

10. In an altimeter, a housing, an expansible and collapsible capsule mounted in the housing, means including a plurality of pointers operatively and adjustably connected to the capsule, dials for the pointers, and means for setting the pointers relative to the dials, said last named means including a flexible shaft.

11. In an altimeter, an expansible and collapsible capsule, means including a plurality of pointers operatively and adjustably connected to said capsule, dials for the pointers, and means for setting the pointers relative to said dials, said last named means including a friction brake for preventing transmission of motion from the capsule to the pointers, and a flexible shaft.

12. In an altimeter, an expansible and collapsible member, motion amplifying means operatively connected to said member, pointers operatively connected to the amplifying means, dials for the pointers, reference means for indicating a pre-set condition of the altimeter and common means for adjusting the pointers and reference means, said common means including a flexible shaft.

13. In apparatus of the class described, an expansible and collapsible member, motion amplifying means operatively connected to said member, a high speed pointer and a low speed pointer operatively connected to said motion amplifying means, dials for said pointers and means for adjusting the pointers relative to the dials, said last named means including a friction disc adapted to be operatively connected to the expansible member, a flexible shaft operatively connected to said pointers, and yielding means for normally holding said disc in inoperative position.

14. In an indicating instrument of the class described, a pressure sensitive capsule, means including a plurality of pointers operatively and adjustably connected to said capsule, dials for the pointers, reference means for indicating a pre-set condition of the instrument, and manually operable mechanism for adjusting said pointers and reference means, said mechanism including a friction brake and a flexible shaft operatively connected to said pointers.

15. In an altimeter, a pressure sensitive expansible and collapsible member, means including a plurality of pointers operatively and adjustably connected to said member, dials for the pointers, reference means for indicating a predetermined altitude for which the altimeter is adapted to be set, and means for adjusting said pointers with respect to said dials to establish a predetermined relation therebetween so that the pointers will produce a desired indication in the dials when the predetermined altitude is reached, said last mentioned means including means for simultaneously setting said reference means to indicate the predetermined altitude, and means for rendering the pressure sensitive member inoperative during the setting action without disturbing the initial relation between said member and the pointers.

16. In an altimeter, a pressure sensitive member, a rockshaft connected to said member for actuation thereby upon changes of pressure, a hollow shaft concentric with said rockshaft, pointers operatively connected to said hollow shaft, dials for said pointers, a brake member carried by the rock shaft, reference means for indicating a pre-set altitude independently of the dials, means interconnecting the rockshaft and hollow shaft for causing them to be moved as a unit by the pressure sensitive member during indicating action, and means for adjusting the pointers and reference means, said last mentioned means including a second brake member co-operating with the first brake member for holding the rockshaft while the setting is made, and means for rotating the hollow shaft with respect to the rockshaft through the means interconnecting said shafts whereby the pointers are moved independently of the rockshaft.

17. In an indicating instrument, pointer means, dial means, actuating means effective upon changes of conditions for operating the pointer means to indicate such changes, reference means for indicating a predetermined condition for which the instrument is adapted to be set, and means for adjusting the pointer means and reference means simultaneously, said adjusting means including means for maintaining said actuating means inoperative during setting without altering the initial relation between the pointer means and said actuating means.

18. In an altimeter, a pressure sensitive element, motion amplifying means adapted to be actuated by said element, pointer means operatively connected to said amplifying means, dial means co-operating with said pointer means, means for adjusting said pointer means with respect to said dial means, and means for holding a portion of said amplifying means inoperative during adjustment of the pointer means.

19. In an indicating instrument, a plurality of pointers, dials for the respective pointers, actuating means, motion amplifying means connecting said actuating means to said pointers for operating the latter, means for adjusting the pointers with respect to said dials, and means for holding a portion of said motion amplifying means inoperative while the pointers are being adjusted.

20. In an altimeter, a pressure sensitive element, motion amplifying means adapted to be actuated by said element, pointers operatively connected to said amplifying means, dials for the pointers, reference means for indicating a predetermined altitude for which the altimeter is adapted to be set, means for simultaneously adjusting the pointers and reference means, and means for rendering a portion of said amplifying means inoperative while the adjustment is being made.

21. In an indicating instrument, the combination of pointer means, scale means, an actuating device responsive to changes in conditions for operating said pointer means to indicate such changes, and means for setting the instrument for a predetermined condition so that said pointer means will give a desired indication when said condition occurs said setting means including means drivably connecting said actuating device and pointer means in such a manner that the pointer means may be operated separately by said setting means and said actuating device.

22. In an indicating instrument, the combination of pointer means, scale means, an actuating device responsive to changes in conditions for operating said pointer means to indicate such changes, and means for setting the instrument for a predetermined condition so that said pointer means will give a desired indication when said condition occurs, said setting means including means drivably connecting said actuating device and pointer means in such a manner that the pointer means may be operated separately by said setting means and said actuating device, and means simultaneously operable with said setting means for indicating the condition for which the instrument has been set.

23. In an indicating instrument, an actuating device, means including a plurality of pointers operatively and adjustably connected to said device, dials for the pointers, and setting means for causing a relative movement between said pointers and dials, said setting means including means drivably connecting the actuating device and the pointers in such a manner that the relative movement may be produced separately by said actuating device and said setting means.

24. In an indicating instrument, an actuating device, means including a plurality of pointers operatively and adjustably connected to said device, dials for the pointers, and setting means for causing a relative movement between said pointers and dials, said setting means including means drivably connecting the actuating device and the pointers in such a manner that the relative movement may be produced separately by said actuating device and said setting means, and means simultaneously operable with said setting means for indicating the setting.

25. In an indicating instrument, a bodily stationary actuating device responsive to changes in conditions or operations to be indicated, a pair of scales, a pair of pointers cooperating with said scales, a gear train interconnecting said pointers whereby one of said pointers moves only a fraction of a revolution for a complete revolution of the other either during setting or indicating action, transmission and motion amplifying means drivably connecting said gear train and actuating device to actuate said pointers, and setting means including means in said transmission means and forming a part thereof for setting the pointers for a predetermined condition while the actuating device remains bodily stationary so that said pointers will give a desired indication when the predetermined condition occurs or is reached.

26. In an indicating instrument, a bodily stationary actuating device responsive to changes in conditions or operations to be indicated, a pair of scales, a pair of pointers cooperating with said scales, a gear train interconnecting said pointers whereby one of said pointers moves only a fraction of a revolution for a complete revolution of the other either during setting or indicating action, transmission and motion amplifying means drivably connecting said gear train and actuating device to actuate said pointers, setting means including means in said transmission means and forming a part thereof for setting the pointers for a predetermined condition while the actuating device remains bodily stationary so that said pointers will give a desired indication when the predetermined condition occurs or is reached, and means simultaneously operable with said setting means for indicating the setting.

ADOLF URFER.